United States Patent
Amano et al.

(10) Patent No.: US 8,959,702 B2
(45) Date of Patent: Feb. 24, 2015

(54) WIPER BLADE

(75) Inventors: Shinichirou Amano, Toyohashi (JP); Hiroki Oohashi, Toyohashi (JP); Kei Hirata, Hamamatsu (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 626 days.

(21) Appl. No.: 13/241,712

(22) Filed: Sep. 23, 2011

(65) Prior Publication Data

US 2012/0090124 A1   Apr. 19, 2012

(30) Foreign Application Priority Data

Oct. 15, 2010   (JP) .................. 2010-232799

(51) Int. Cl.
*B60S 1/40* (2006.01)
*B60S 1/38* (2006.01)

(52) U.S. Cl.
CPC ............. *B60S 1/4006* (2013.01); *B60S 1/3801* (2013.01)
USPC .................. 15/250.361; 15/250.32; 15/250.44

(58) Field of Classification Search
CPC ............... B60S 1/4006–1/4019; B60S 1/3865; B60S 1/3867
USPC ........... 15/250.32, 250.361, 250.201, 250.43, 15/250.44
See application file for complete search history.

(56) References Cited

U.S. PATENT DOCUMENTS

| | | | | | |
|---|---|---|---|---|---|
| 4,296,521 | A | * | 10/1981 | Mower ....................... | 15/250.32 |
| 6,550,096 | B1 | * | 4/2003 | Stewart et al. .............. | 15/250.32 |
| 6,859,985 | B1 | * | 3/2005 | Nakazawa et al. .............. | 29/428 |
| 2004/0111820 | A1 | * | 6/2004 | Aoyama et al. .......... | 15/250.201 |
| 2008/0201892 | A1 | * | 8/2008 | Fujiwara et al. ............ | 15/250.32 |

FOREIGN PATENT DOCUMENTS

| | | |
|---|---|---|
| JP | H08-293184 A | 11/1996 |
| JP | A-2008-168796 | 7/2008 |
| JP | 2008-213552 A | 9/2008 |

OTHER PUBLICATIONS

. Office Action dated Feb. 21, 2014 issued in corresponding JP application No. 2010-232799 (with English translation).

* cited by examiner

*Primary Examiner* — Monica Carter
*Assistant Examiner* — Andrew A Horton
(74) *Attorney, Agent, or Firm* — Posz Law Group, PLC

(57) ABSTRACT

An arm piece of a wiper arm, which has a connecting portion connected to a connecting pin through a connecting member received in an opening of a main lever, extends from the connecting portion toward a base end side portion of the main lever such that the arm piece overlaps with an upper surface of the main lever. The main lever is formed by runnerless injection molding. A gate trace, which is left on the main lever in the runnerless injection molding, is formed in an arm accommodation portion of the main lever, which is opposed to the arm piece in a top-to-bottom direction.

12 Claims, 3 Drawing Sheets

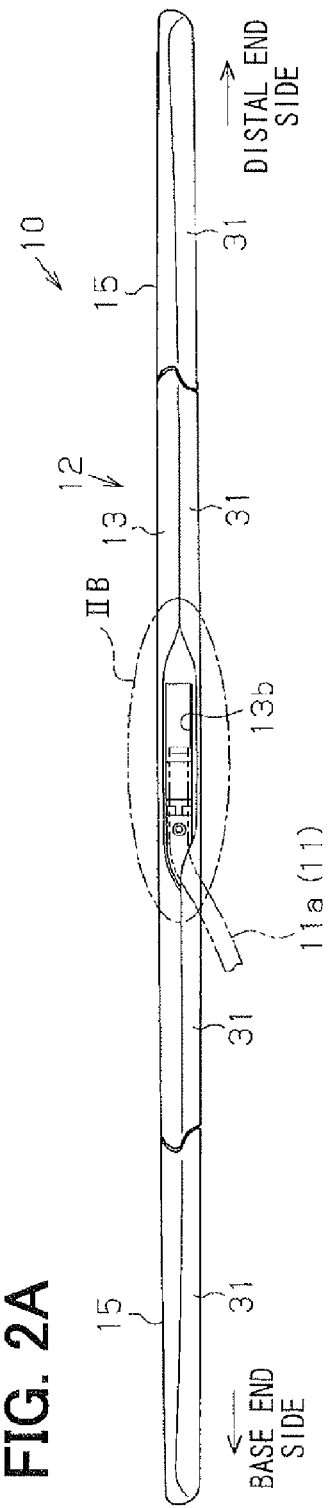
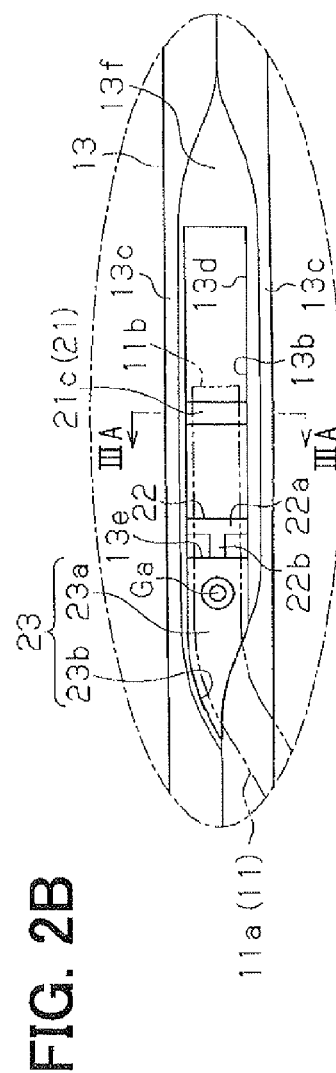
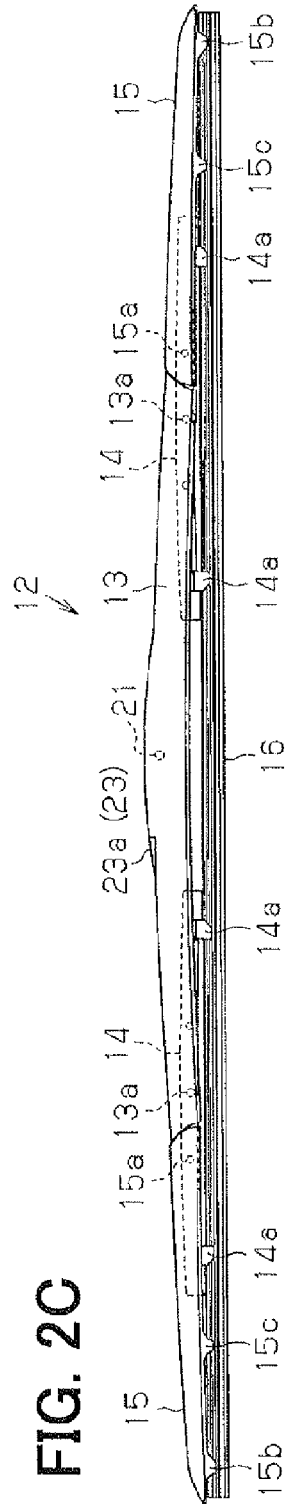
FIG. 2A
FIG. 2B
FIG. 2C

WIPER BLADE

CROSS REFERENCE TO RELATED APPLICATION

This application is based on and incorporates herein by reference Japanese Patent Application No. 2010-232799 filed on Oct. 15, 2010.

BACKGROUND OF THE INVENTION

1. Field of the Invention

The present invention relates to a wiper blade.

2. Description of Related Art

A wiper of a vehicle includes a wiper arm and a wiper blade. The wiper arm is swung by a drive force transmitted from a wiper motor upon energization thereof. The wiper blade is supported by a distal end portion of the wiper arm. For instance, Japanese Unexamined Patent Publication JP2008-168796A teaches such a wiper blade, which includes a holder member (a rubber holder) that is made of a resin material and holds an elongated wiper strip to wipe a wiping surface (a surface of a windshield). The wiper strip is located on a lower side of the holder member in a top-to-bottom direction of the holder member. Furthermore, the holder member has an opening, which extends through the holder member in the top-to-bottom direction of the holder member. A connecting shaft is placed in the opening of the holder member to extend through the opening and thereby to span between side walls of the opening, which extend in the top-to-bottom direction and are opposed to each other. A distal end portion of the wiper arm is connected to the connecting shaft through a connecting member, which is received in the opening.

In the case of the wiper blade discussed above, if the holder member, which is made of the resin material, is formed through injection molding (runnerless injection molding) using a runnerless molding die, the following advantages can be achieved. Specifically, due to absence of a runner in the molding die, it is not required to fill the resin material in the runner, and thereby the yield can be improved. Also, a removing operation for removing the resin part, which corresponds to the runner, from the final product of the holder member is not required, so that the manufacturing process can be simplified. However, in this molding method, a nozzle is placed to directly contact a gate of a cavity of the molding die, and the molten resin material is filled into the cavity through the nozzle. Therefore, a gate trace is left on the molded product. Thus, in a case where a good exterior design of the wiper blade needs to be achieved, when the holder member of the wiper blade is formed through the injection molding using the runnerless molding die, the appearance of the holder member may possibly be deteriorated by the gate trace. Therefore, it has been demanded to improve this point.

SUMMARY OF THE INVENTION

The present invention is made in view of the above disadvantage. Thus, it is an objective of the present invention to provide a wiper blade, which can limit deterioration in an appearance of the wiper blade while allowing simplification of a manufacturing process of the wiper blade.

According to the present invention, there is provided a wiper blade, which includes a wiper strip and a holder member. The wiper strip is elongated and is adapted to wipe a wiping surface. The holder member is made of a resin material and directly or indirectly holds the wiper strip. The wiper strip is located on a lower side of the holder member in a top-to-bottom direction of the holder member. The holder member includes an opening that is placed in a center portion of the holder member in a longitudinal direction of the holder member and extends through the holder member in the top-to-bottom direction. A connecting shaft is held by the holder member in the opening of the holder member to extend through the opening of the holder member. The connecting shaft is adapted to be connected to a connecting portion of a wiper arm through a connecting member, which is received in the opening of the holder member, and the holder member is adapted to accommodate the wiper arm such that the wiper arm extends from the connecting portion of the wiper arm toward a base end side portion of the holder member and overlaps with an upper surface of the holder member when the connecting shaft is connected to the connecting portion of the wiper arm through the connecting member. The holder member is injection molded by runnerless injection molding. A gate trace, which is left on the holder member in the runnerless injection molding, is formed in a portion of the upper surface of the holder member, which is adjacent to a base end side portion of the opening and is adapted to be opposed to the wiper arm in the top-to-bottom direction when the connecting shaft is connected to the connecting portion of the wiper arm through the connecting member.

According to the present invention, there is also provided a wiper blade, which includes a wiper strip and a holder member. A wiper strip is elongated and is adapted to wipe a wiping surface. The holder member is made of a resin material and directly or indirectly holds the wiper strip. The wiper strip is located on a lower side of the holder member in a top-to-bottom direction of the holder member. The holder member includes an opening, first and second side walls and an upper wall. The opening is placed in a center portion of the holder member in a longitudinal direction of the holder member and extends through the holder member in the top-to-bottom direction. The first and second side walls are opposed to each other and are exposed to the opening of the holder member. The upper wall is placed at an upper side of the holder member in the top-to-bottom direction at a location adjacent to the opening of the holder member and connects between the first and second side walls. The opening receives a connecting member, which is adapted to be connected to a wiper arm. A connecting shaft, to which the connecting member is installed, is held by the first and second side walls and extends through the opening of the holder member. An arm accommodation portion is formed in the upper wall on a base end side of the opening in the longitudinal direction of the holder member to accommodate the wiper arm such that the wiper arm overlaps with an upper surface of the upper wall when the wiper arm is connected to the connecting member. The holder member is injection molded by runnerless injection molding. A gate trace, which is left on the holder member in the runnerless injection molding, is formed in the arm accommodation portion.

BRIEF DESCRIPTION OF THE DRAWINGS

The invention, together with additional objectives, features and advantages thereof, will be best understood from the following description, the appended claims and the accompanying drawings in which:

FIG. 2A is a plan view of a wiper blade of the wiper shown in FIG. 1A;

FIG. 2B is a partial enlarged view showing an area IIB in FIG. 2A;

FIG. 2C is a side view of the wiper blade shown in FIGS. 2A and 2B;

DETAILED DESCRIPTION OF THE INVENTION

An embodiment of the present invention will be described with reference to the accompanying drawings.

Figure 1A:
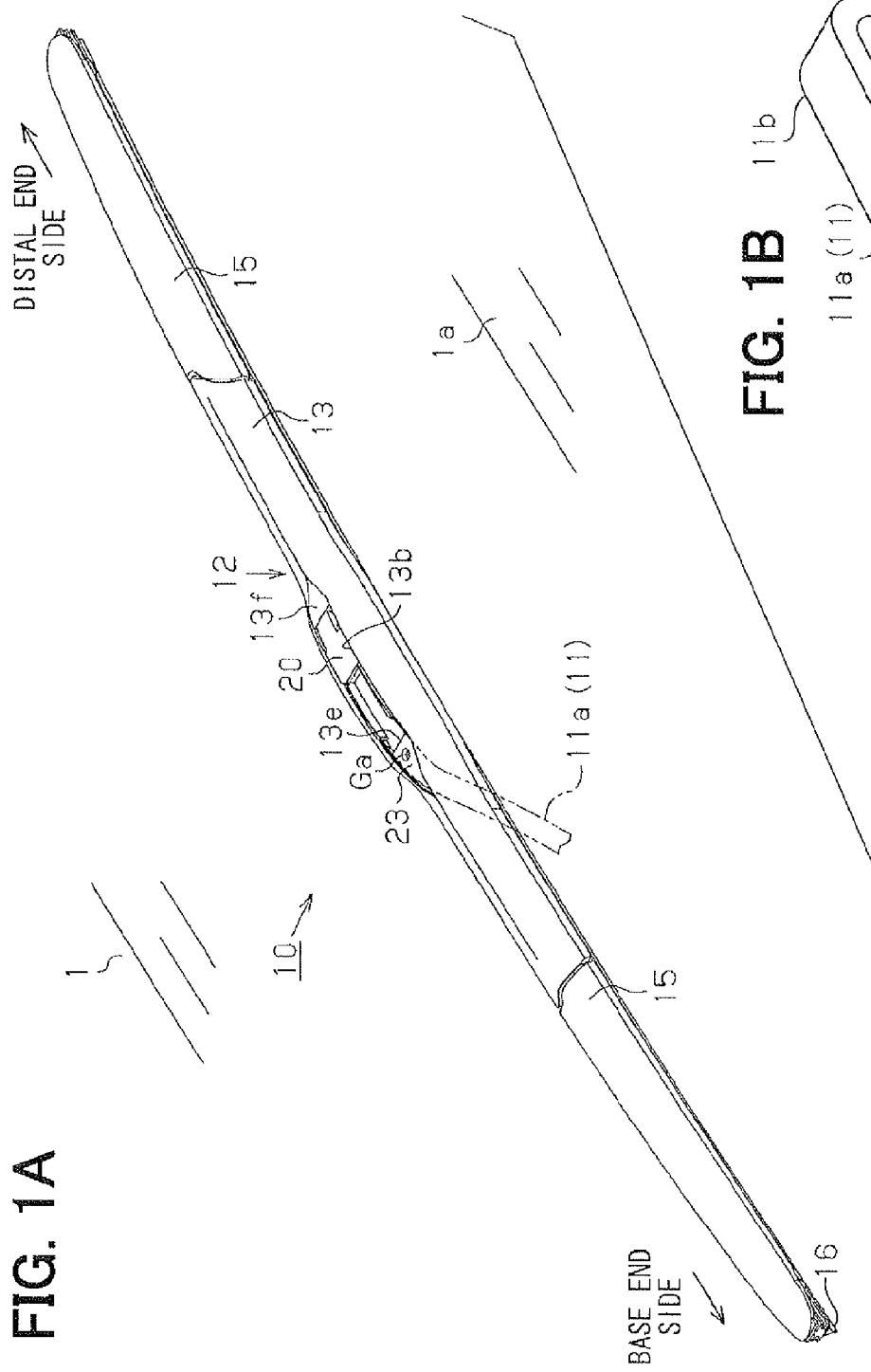
FIG. 1A is a perspective view showing a wiper according to an embodiment of the present invention.

FIG. 1A shows a wiper 10 of a vehicle, which is adapted to wipe, for example, rain droplets adhered to a front glass (windshield) 1 of the vehicle. The wiper 10 includes a wiper arm 11 and a wiper blade 12. The wiper arm 11 includes an arm piece 11a at a distal end section thereof. The wiper blade 12 is supported by a distal end portion (a connecting portion) 11b of the arm piece 11a and contacts a wiping surface 1a of the front glass 1. When the wiper arm 11 is swung by a drive force, which is generated by a wiper motor (not shown) upon energization thereof, the wiper blade 12 is swung to wipe the wiping surface 1a of the front glass 1. In the following description, a base end side of the wiper blade 12 refers to a longitudinal side of the wiper blade 12, which is closer to a base end (not shown) of the wiper arm 11, i.e., is closer to a swing axis of the wiper blade 12 and of the wiper arm 11, and a distal end side of the wiper blade 12 refers to a longitudinal side of the wiper blade 12, which is further from the base end of the wiper arm 11, i.e., is further from the swing axis of the wiper blade 12 and of the wiper arm 11.

Figure 1B:
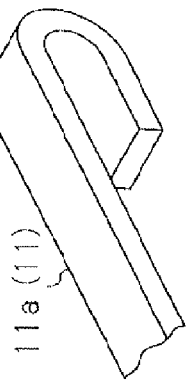
FIG. 1B is a partial enlarged perspective view showing a distal end portion of an arm piece of a wiper arm in the wiper shown in FIG. 1A.

A connecting member 20 is installed to a longitudinal center portion of the wiper blade 12 to connect between the arm piece 11a of the wiper arm 11 and the wiper blade 12. Now, structures of the arm piece 11a and the wiper blade 12 will be described. With reference to FIGS. 1A and 1B, the arm piece 11a is a planar rod member (elongated plate member) made of a metal plate material. The distal end portion 11b of the arm piece 11a, which is a wiping surface 1a side free end portion and serves as the connecting portion of the wiper arm 11, is configured into a U-shape hook form (see FIG. 1B). A spring (not shown) is installed to the wiper arm 11 to exert an urging force to urge the wiper blade 12 against the wiping surface 1a.

As shown in FIGS. 2A to 2C, the wiper blade 12 includes a main lever (holder member) 13, two yoke levers 14, two movable cover members 15 and a wiper strip 16. A rotational shaft 13a is provided at each of two opposed longitudinal end portions of the main lever 13. A longitudinal center portion (rotatable connecting portion) of each yoke lever 14 is installed to the corresponding rotational shaft 13a, so that the yoke lever 14 is rotatable, i.e., pivotable relative to the main lever 13. Exteriors of the main lever 13 and the movable cover members 15 cooperate together to form an exterior of the wiper blade 12.

A base end portion of each movable cover member 15 is installed to a corresponding portion of each yoke lever 14, which is slightly longitudinally outwardly displaced from the rotatable connecting portion of the yoke lever 14 located at the longitudinal center portion of the yoke lever 14, through a corresponding rotational shaft 15a, so that the movable cover member 15 is rotatable, i.e., pivotable relative to the yoke lever 14. Two clamping claws 14a, which are opposed to each other in a widthwise direction (i.e., a direction that is perpendicular to the longitudinal direction of the wiper blade 12 and is generally parallel to the wiping surface 1a) of the wiper blade 12, are formed at each of two opposed longitudinal end portions of each yoke lever 14. Furthermore, two clamping claws 15b, which are opposed to each other in the widthwise direction of the wiper blade 12, are formed at a longitudinally outer end portion of each movable cover member 15, which is opposite from the main lever 13 in the longitudinal direction of the wiper blade 12. The clamping claws 14a and the clamping claws 15b are arranged at predetermined longitudinal intervals and clamp the wiper strip 16. Each movable cover member 15 further includes two limiting pieces 15c, which are longitudinally placed between the clamping claws 15b of the movable cover member 15 and the longitudinally outer clamping claws 14a of the adjacent yoke lever 14 that is adjacent to the movable cover member 15. The limiting pieces 15c limit movement (or tilt) of the wiper strip 16 in the widthwise direction of the wiper blade 12.

Figure 3A:
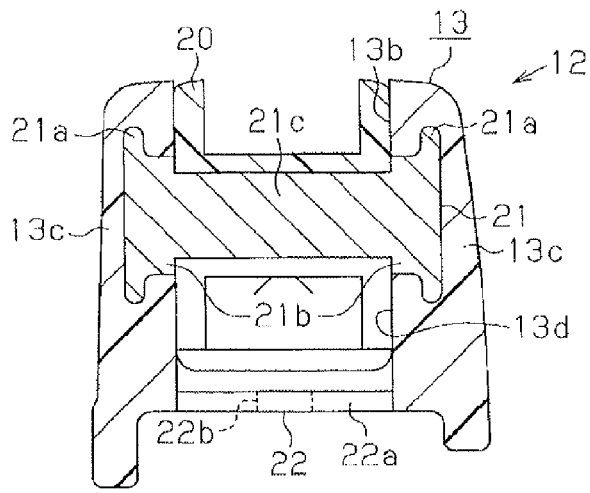
FIG. 3A is an enlarged cross-sectional view of a main lever of the wiper blade taken along line IIIA-IIIA in FIG. 2B while eliminating a wiper strip of the wiper blade for the sake of easy understanding.
Figure 3B:
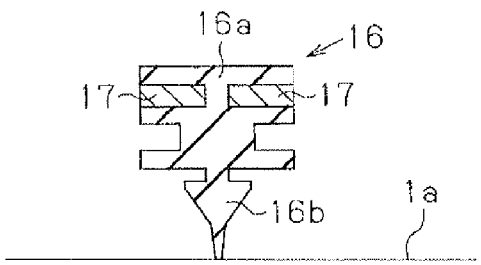
FIG. 3B is an enlarged cross-sectional view of the wiper strip taken along line IIIA-IIIA in FIG. 2B upon removal of the wiper strip from the main lever.

The wiper strip 16 is made of a rubber material (synthetic rubber or natural rubber) or any other suitable type of elastic resin material and includes an upper portion (base) 16a and a wiping portion (wiping lip) 16b, as shown in FIG. 3B. The upper portion 16a is clamped by the clamping claws 14a, 15b. The wiping portion 16b extends downwardly from the upper portion 16a toward the wiping surface 1a. Two backing plates 17, which are made of a spring material, are installed to two lateral sides of the upper portion 16a of the wiper strip 16, which are opposed to each other in the widthwise direction of the wiper blade 12. The backing plates 17 spread the urging force, which is applied from the wiper arm 11 to the wiper blade 12, in the longitudinal direction of the wiper blade 12.

The main lever 13 is made of a resin material, and a cross-sectional area of the main lever 13 is configured to have a generally U-shape form that opens toward the wiping surface 1a side. As shown in FIGS. 1A and 2A-2B, an opening 13b is formed in a longitudinal center portion of the main lever 13 and extends through an upper wall (top wall) 13f of the main lever 13 in the top-to-bottom direction. In a view taken in the top-to-bottom direction (the vertical direction that is perpendicular to the wiping surface 1a), the opening 13b is configured into an elongated rectangular form having long sides, which extend in the longitudinal direction of the wiper blade 12. A connecting pin (serving as a connecting shaft) 21, which is configured into a cylindrical form and is made of a metal material, extends between first and second side walls 13c of the opening 13b, which extend in the top-to-bottom direction and are opposed to each other in the widthwise direction of the wiper blade 12.

The connecting pin 21 is integrally molded in the main lever 13 by insert molding such that the connecting pin 21 extends in the widthwise direction. As shown in FIG. 3A, a flange portion 21a, which is configured into a circular disk form, is formed at each of first and second end portions of the connecting pin 21, which are opposed to each other in an axial direction of the connecting pin 21, i.e., in the widthwise direction of the wiper blade 12. The flange portions 21a of the connecting pin 21 are embedded in the first and second side walls 13c, respectively. Furthermore, in the connecting pin 21, a step portion 21b is formed on an axially inner side of each of the flange portions 21a such that the step portion 21b has an outer diameter smaller than that of the flange portion 21a. An axially inner end surface of each of the step portions 21b is generally flush with an inner surface 13d of a corresponding one of the first and second side walls 13c, and a shaft portion 21c, which is axially placed between the step portions 21b, is received in the opening 13b.

Furthermore, with reference to FIGS. 2A, 2B and 3A, a reinforcing portion 22 is formed at a lower part (wiper strip 16 side end part) of a base end side portion (left end portion in FIGS. 2A and 2B) of the opening 13b. The reinforcing portion 22 is configured into a T-shape and includes a first bridge 22a and a second bridge 22b. The first bridge 22a extends between the first and second side walls 13c of the opening 13b in the widthwise direction of the wiper blade 12. The second bridge 22b extends from a widthwise center part of the first bridge 22a to a base end side wall 13e (left end wall in FIG. 2B) of the opening 13b in the longitudinal direction of the wiper blade 12. As shown in FIG. 3A, the first bridge 22a and the second bridge 22b of the reinforcing portion 22 are configured into a plate form (i.e., planar form).

An arm accommodation portion 23 is formed as a recess that is recessed in the top-to-bottom direction in a base end side portion (a left end portion in FIGS. 2A and 2B) of the upper wall 13f that is located at the upper part of the opening 13b, which is opposite from the lower part of the opening 13b located at the wiper strip 16 side of the wiper blade 12. The arm accommodation portion 23 includes a base surface 23a and a lateral surface 23b. The base surface 23a is a planar surface that is generally perpendicular to the top-to-bottom direction and is generally parallel to the wiping surface 1a. The base surface 23a serves as an upper surface (top side surface) of the main lever 13, which is located on the upper side of the main lever 13 in the top-to-bottom direction. The lateral surface 23b is located at a widthwise lateral side and extends in a direction generally perpendicular to the base surface 23a. A gate trace Ga, which is formed at the time of executing runnerless injection molding, is located in the base surface 23a. The lateral surface 23b of the arm accommodation portion 23 is directed toward a vehicle front side.

In the wiper blade 12 of the present embodiment, as shown in FIG. 2A, fin portions 31 are provided in the main lever 13 and the movable cover members 15 along the vehicle front side lateral walls thereof except the location of the first and second side walls 13c of the opening 13b. The fin portions 31 receive a head wind, which is applied to the vehicle upon traveling of the vehicle, and thereby the fin portions 31 exert an urging force to urge the wiper blade 12 against the wiping surface 1a upon receiving the head wind.

As shown in FIG. 1A, the connecting member 20 is configured to be connected to the distal end portion 11b of the arm piece 11a, which is formed into the U-shape hook form (see FIG. 1B). The connecting member 20 is fitted into the opening 13b, and the connecting member 20 is installed to the connecting pin 21 in a rotatable manner relative to the connecting pin 21. The arm piece 11a extends from the distal end portion 11b, which is connected to the connecting pin 21, toward the base end side portion of the wiper blade 12, and the arm piece 11a is accommodated in the arm accommodation portion 23. Specifically, the arm piece 11a, which is in the planar rod member, is constructed such that a plate surface (planar surface) of the arm piece 11a, which extends in a plane of the arm piece 11a, is opposed to the base surface 23a of the arm accommodation portion 23 in the top-to-bottom direction. A portion of the arm piece 11a is curved into a shape that is in conformity with a shape of the lateral surface 23b of the arm accommodation portion 23, and a base end side of the arm piece 11a extends out from the arm accommodation portion 23 on the wiper blade front side (vehicle front side). Furthermore, in the installed state, in which the wiper blade 12 is installed to the arm piece 11a, the plate surface (plane) of the arm piece 11a and the base surface 23a of the arm accommodation portion 23 are generally parallel to each other. However, during the time of wiping the wiping surface 1a with the wiper blade 12, the wiper blade 12 is slightly rotated about the connecting pin 21 relative to the arm piece 11a, so that a size of a gap between the arm piece 11a and the base surface 23a of the arm accommodation portion 23 also slightly changes.

Figure 4:
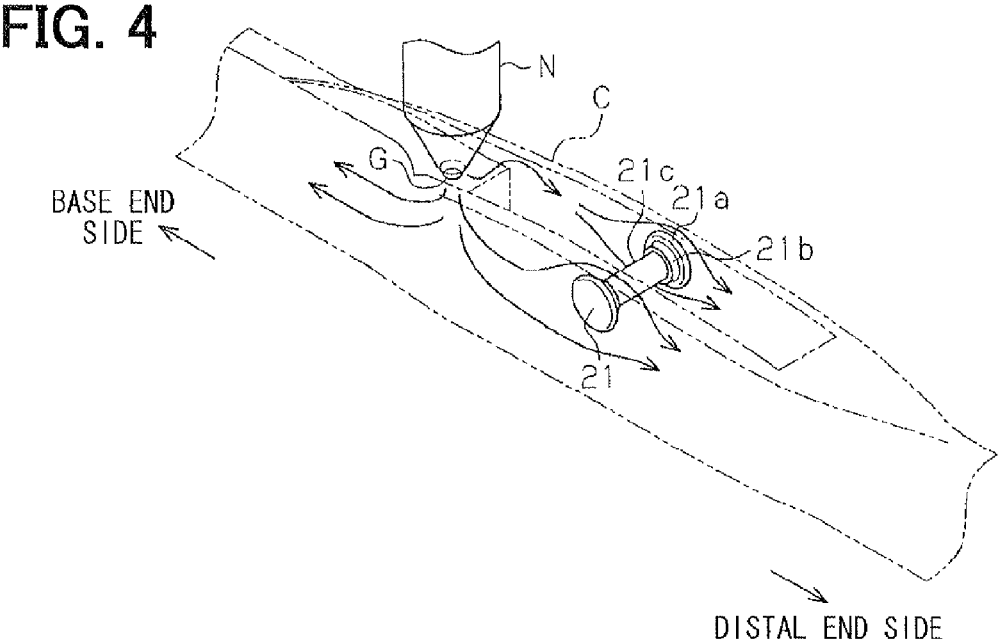
FIG. 4 is a descriptive perspective view for describing injection molding of the main lever of the wiper blade of the embodiment.

Next, the runnerless injection molding of the main lever 13 will be described. As shown in FIG. 4, in the runnerless injection molding process, the shaft portion 21c of the connecting pin 21, which serves as an insert (metal inset), is positioned and is held in a cavity C of a molding die such that the axial direction of the connecting pin 21 coincides with the widthwise direction of the wiper blade 12. At this time, the step portions 21b of the connecting pin 21 contact the molding die in the axial direction of the connecting pin 21, so that the connecting pin 21 is positioned in the state where the axial movement of the connecting pin 21 in the axial direction thereof is limited.

In the runnerless injection molding process, a nozzle N, which injects a molten resin material into the cavity C, is directly connected to the cavity C, so that a surface of the main lever 13 has a trace (the gate trace Ga in FIGS. 1A and 2B) of a gate G that serves as an inlet, through which the molten resin material is supplied into the cavity C. In this construction, the position of the gate G is set such that the gate trace Ga, which is left on the main lever 13, is formed in a portion of the upper wall 13f located on the base end side of the opening 13b of the main lever 13 in the longitudinal direction, more specifically, is formed in the base surface 23a of the arm accommodation portion 23 of the upper wall 13f located on the base end side of the opening 13b of the main lever 13 in the longitudinal direction. Therefore, a top side of the gate trace Ga is covered with the arm piece 11a and thereby cannot be easily seen. In this way, the main lever 13 is formed through the runnerless injection molding, so that the manufacturing process of the wiper blade 12 is simplified, and the deterioration in the appearance of the wiper blade 12 is substantially limited.

Furthermore, the gate G is placed at the location adjacent to the opening 13b, which is placed at the longitudinal center portion of the wiper blade 12 (more specifically the main lever 13). Therefore, the molten resin material can be equally supplied from the gate G to the base end side and the distal end side of the wiper blade 12 (more specifically the main lever 13), which is configured to be generally symmetrical about the connecting pin 21. The connecting pin 21 is integrally insert molded as the insert in the main lever 13. Therefore, as indicated by solid line arrows in FIG. 4, at the time of injection molding, a flow of the molten resin material is divided at the connecting pin 21 and is directed to the opposite side of the connecting pin 21, which is opposite from the gate G in the longitudinal direction, i.e., is directed toward the distal end side of the main lever 13. That is, according to the above-described construction, the gate G is placed on the base end side of the opening 13b. Therefore, at the time of injection molding, it is possible to limit or minimize generation of a weld line, (also referred to as a knit line) on the base end side of the connecting pin 21 (i.e., the base end side of the opening 13b). Furthermore, according to the present embodiment, the connecting pin 21 has the flange portions 21a, which have the outer diameter larger than that of the shaft portion 21c, so that the flow of the molten resin material could possibly be largely divided at the flange portions 21a to generate the weld line at the distal end side of the main lever 13. However, it is possible to avoid the generation of the weld line at the base end side of the main lever 13 regardless of the size of the flange portions 21a.

The distal end portion 11b of the arm piece 11a is configured into the U-shape hook form that opens toward the base end side of the opening 13b. Furthermore, the distal end portion 11b of the arm piece 11a, which is configured into the U-shape hook form, is engaged with the connecting pin 21 through the connecting member 20, which is received in the opening 13b. At this time, the connecting pin 21 of the wiper blade 12 may be tilted relative to the arm piece 11a in the view taken in the top-to-bottom direction. Specifically, with reference to FIGS. 2A and 2B, when the rotational force is exerted to rotate the wiper blade 12 about the connecting pin 21 in a clockwise direction or a counterclockwise direction, i.e., when the rotational force is exerted to rotate the wiper blade 12 relative to the wiper arm 11 in a wiping direction (a direction that is generally parallel to the wiping surface 1a), the main lever 13 receives an opening force from the arm piece 11a to open, i.e., widen the base end side portion of the opening 13b in the widthwise direction (the axial direction of the connecting pin 21), i.e., a force that is directed to push the first and second side walls 13c of the opening 13b away from each other. Specifically, in this construction, the gate G is placed on the base end side of the opening 13b, so that the generation of the weld line on the base end side of the opening 13b, to which the force is applied from the arm piece 11a, is limited or minimized. Thus, it is possible to avoid a damage of the main lever 13 at the opening 13b. Furthermore, the reinforcing portion 22, which is configured into the T-shape, is formed at the base end side portion of the opening 13b. Therefore, the strength of the base end side of the opening 13b, which receives the force from the arm piece 11a, is improved.

Next, advantages of the present embodiment will be described.

(1) In the present embodiment, the arm piece 11a, which has the distal end portion 11b connected to the connecting pin 21 through the connecting member 20 received in the opening 13b, extends from the distal end portion 11b thereof toward the base end side portion of the main lever 13 and overlaps with the upper surface (top side surface) of the main lever 13. The main lever 13 is formed by the runnerless injection molding, and the gate trace Ga, which is left on the main lever 13 at the runnerless injection molding, is located in the upper wall 13f on the base end side of the opening 13b, more specifically, in the arm accommodation portion 23, which is opposed to the arm piece 11a in the top-to-bottom direction. In this way, the gate trace Ga, which is formed in the main lever 13, is covered by and is hidden under the arm piece 11a at the time of using the wiper blade 12, so that the gate trace Ga is less visible. Accordingly, the manufacturing process of the wiper blade 12 is simplified by forming the main lever 13 through the runnerless injection molding, and the deterioration in the appearance of the wiper blade 12 is substantially limited.

(2) In the present embodiment, the distal end portion 11b of the arm piece 11a is configured into the U-shape hook form that opens toward the base end side of the opening 13b. Furthermore, the distal end portion 11b of the arm piece 11a, which is configured into the U-shape hook form, is engaged with the connecting pin 21 through the connecting member 20, which is received in the opening 13b. At this time, when the connecting pin 21 of the wiper blade 12 is tilted relative to the arm piece 11a in the view taken in the top-to-bottom direction, the main lever 13 receives the opening force from the arm piece 11a to open the base end side of the opening 13b in the widthwise direction (the axial direction of the connecting pin 21), i.e., the force that is directed to push the first and second side walls 13c of the opening 13b away from each other. The connecting pin 21 is integrally molded as the insert in the main lever 13. Therefore, at the time of injection molding, the flow of the molten resin material is divided at the connecting pin 21 and is directed to the opposite side of the connecting pin 21, which is opposite from the gate G in the longitudinal direction, i.e., is directed to toward the distal end side of the main lever 13. The gate G is placed on the base end side of the opening 13b. Therefore, at the time of injection molding, it is possible to limit or minimize the generation of the weld line on the base end side of the connecting pin 21 (i.e., the base end side of the opening 13b). In this way, it is possible to limit the reduction in the strength of the main lever 13 caused by the weld line at the location on the base end side of the opening 13b, to which the force from the arm piece 11a is applied. Therefore, it is possible to limit the damage of the main lever 13.

(3) In the present embodiment, the flange portions 21a, which are embedded in the main lever 13, are formed at the first and second end portions of the connecting pin 21. Therefore, it is possible to have a larger contact surface area at each axial end of the connecting pin 21, which contacts the main lever 13 in the axial direction of the connecting pin 21. Thereby, it is possible to improve the strength of the opening 13b of the main lever 13 in the widthwise direction. Furthermore, the step portions 21b, each of which is formed on the axially inner side of the corresponding flange portion 21a in the axial direction of the connecting pin 21, enable the positioning and holding of the connecting pin 21 in the molding die at the time of insert molding. Therefore, the manufacturing of the main lever 13 is eased.

(4) In the present embodiment, the inner end surface of each step portion 21b is generally flush with the inner surface 13d of the corresponding one of the first and second side walls 13c of the opening 13b. Thereby, the step portion 21b of the connecting pin 21 does not project from the corresponding one of the first and second side walls 13c of the opening 13b. Thus, it is possible to eliminate a wasteful gap between the connecting member 20, which is received in the opening 13b, and each of the first and second side walls 13c. In this way, the rattling of the connecting member 20 and thereby of the wiper blade 12 in the wiping direction can be limiting.

(5) In the present embodiment, the reinforcing portion 22, which spans between the first and second side walls 13c, is provided at the base end side portion in the opening 13b. Therefore, it is possible to further improve the strength at the base end side of the opening 13b, to which the widening force is applied from the arm piece 11a in the widthwise direction.

(6) The arm accommodation portion 23 is formed as the recess that is recessed in the top-to-bottom direction in the base end side portion of the upper wall 13f. Thereby, the arm piece 11a of the wiper arm 11 can be received in the arm accommodation portion 23 while limiting or minimizing the projection of the arm piece 11a from the upper wall 13f in the top-to-bottom direction. Thus, the design of the wiper arm 12 can be further improved to further improve the appearance of the wiper arm 12.

The above embodiment of the present invention may be modified as follows.

In the above embodiment, the connecting pin 21, which is formed separately from the main lever 13 and is made of the metal material, is used as the connecting shaft. Alternatively, the connecting shaft may be formed integrally with the main lever 13 from the resin material.

In the above embodiment, the movable cover members 15 are provided on the opposite longitudinal sides, respectively, of the main lever 13. However, the present invention is not limited to this. For example, the movable cover members 15 may be eliminated. Furthermore, in the above embodiment, the yoke levers 14 are rotatably supported by the longitudinal end portions, respectively, of the main lever 13, and the wiper strip 16 is indirectly held by the main lever 13 through the yoke levers 14. However, the present invention is not limited to this. For example, the clamping claws may be provided at the longitudinal end portions of the main lever 13 to directly hold, i.e., clamp the wiper strip 16 (i.e., claiming the wiper strip 16 at two longitudinal points).

In the above embodiment, the reinforcing portion 22 is formed into the T-shape form having the first bridge 22a and the second bridge 22b. However, the present invention is not limited to this. For example, the holes between the first bridge 22a and the base end side wall 13e of the opening 13b may be eliminated.

In the above embodiment, the arm piece 11a is formed by the planar rod member, and the planar surface of this arm piece 11a is opposed to the gate trace Ga in the top-to-bottom direction. However, the present invention is not limited to this. For example, the arm piece may be formed by a cylindrical rod member and may be opposed to the gate trace Ga in the top-to-bottom direction to cover and hide the gate trace Ga, so that the gate trace Ga is less visible.

Additional advantages and modifications will readily occur to those skilled in the art. The invention in its broader terms is therefore not limited to the specific details, representative apparatus, and illustrative examples shown and described.

What is claimed is:

1. A wiper blade comprising:
a wiper strip having an elongated structure and configured to wipe a wiping surface; and
a holder member consisting of an injection molded member made of a resin material and directly or indirectly holding the wiper strip, wherein:
the wiper strip is located on a lower side of the holder member in a top-to-bottom direction of the holder member;
the holder member includes an opening that is placed in a center portion of the holder member in a longitudinal direction of the holder member and extends through the holder member in the top-to-bottom direction;
a connecting shaft is held by the holder member in the opening of the holder member to extend through the opening of the holder member;
the connecting shaft is adapted to be connected to a connecting portion of a wiper arm through a connecting member, which is received in the opening of the holder member, and the holder member is adapted to accommodate the wiper arm such that the wiper arm extends from the connecting portion of the wiper arm toward a base end side portion of the holder member and overlaps with an upper surface of the holder member when the connecting shaft is connected to the connecting portion of the wiper arm through the connecting member;
a gate trace, which has a shape that corresponds to a shape of a gate of a molding die used to mold the holder member, is formed in a portion of the upper surface of the holder member, which is adjacent to a base end side portion of the opening and is adapted to be opposed to and beneath the wiper arm in the top-to-bottom direction when the connecting shaft is connected to the connecting portion of the wiper arm through the connecting member;
the connecting shall, extends in an axial direction and has first and second end portions arranged on opposing ends of the connecting shaft in the axial direction of the connecting shaft,
each first and second end portion includes a flange portion embedded in the holder member, and a step portion that is located on an axially inner side of the flange portion in the axial direction of the connecting shaft; and
an axially inner end surface of each of the step portions of the connecting shaft is flush with a corresponding exposed inner surface of one of the first and second side walls in the opening of the holder member.

2. The wiper blade according to claim 1, wherein:
the connecting shaft is made of a metal material; and
the connecting shaft is integrally insert molded as an insert in first and second side walls of the holder member, which are opposed to each other and are exposed to the opening of the holder member, so that the connecting shaft extends through the opening of the holder member.

3. The wiper blade according to claim 2, wherein the connecting member is adapted to be connected to the connecting portion of the wiper arm, which is formed in a distal end portion of the wiper arm and is configured into a hook form that opens toward the base end side portion of the opening of the holder member.

4. The wiper blade according to claim 2, wherein each of first and second end portions of the connecting shaft, which are opposed to each other in an axial direction of the connecting shaft, includes:
a flange portion that is embedded in the holder member; and
a step portion that is located on an axially inner side of the flange portion in the axial direction of the connecting shaft and is used to position the connecting shaft in place at the time of insert molding.

5. The wiper blade according to claim 4, wherein an axially inner end surface of each of the step portions of the connecting shaft is generally flush with an inner surface of a corresponding one of the first and second side walls, which are exposed in the opening of the holder member.

6. The wiper blade according to claim 1, wherein a reinforcing portion is provided in the base end side portion of the opening of the holder member to extend between the first and second side walls in a widthwise direction of the holder member, which is perpendicular to the longitudinal direction of the holder member and is generally parallel to the wiping surface.

7. The wiper blade according to claim 1, wherein the gate trace is a single gate trace, which is formed in a longitudinal center portion of the holder member.

8. A wiper blade comprising:
a wiper strip that is elongated and is adapted to wipe a wiping surface; and
a holder member consisting of an injection molded member made of a resin material and directly or indirectly holding the wiper strip, wherein:
the wiper strip is located on a lower side of the holder member in a top-to-bottom direction of the holder member;
the holder member includes:
an opening that is placed in a center portion of the holder member in a longitudinal direction of the holder member and extends through the holder member in the top-to-bottom direction;

first and second side walls that are opposed to each other and are exposed to the opening of the holder member; and an upper wall that is placed at an upper side of the holder member in the top-to-bottom direction at a location adjacent to the opening of the holder member and connects between the first and second side walls, the opening receives a connecting member, which is adapted to be connected to a wiper arm;

a connecting shaft, to which the connecting member is installed, is held by the first and second side walls and extends through the opening of the holder member;

an arm accommodation portion is formed in the upper wall on a base end side of the opening in the longitudinal direction of the holder member to accommodate the wiper arm such that the wiper arm overlaps with an upper surface of the upper wall when the wiper arm is connected to the connecting member;

a gate trace, which has a shape that corresponds to a shape of a gate of a molding die used to mold the holder member, is formed in the arm accommodation portion and underneath the wiper arm;

each of first and second end portions of the connecting shaft, which are opposed to each other in an axial direction of the connecting shaft, includes:

a flange portion that is embedded in the holder member; and a step portion that is located on an axially inner side of the flange portion in the axial direction of the connecting shaft and is used to position the connecting shaft in place at the time of insert molding; and an axially inner end surface of each of the step portions of the connecting shaft is flush with an inner surface of a corresponding one of the first and second side walls, which are exposed in the opening of the holder member.

9. The wiper blade according to claim 8, wherein the connecting member is adapted to be connected to a connecting portion of the wiper arm, which is formed in a distal end portion of the wiper arm and is configured into a hook form that opens toward a base end side portion of the opening of the holder member.

10. The wiper blade according to claim 8, wherein a reinforcing portion is provided in a base end side portion of the opening of the holder member to extend between the first and second side walls in a widthwise direction of the holder member, which is perpendicular to the longitudinal direction of the holder member and is generally parallel to the wiping surface.

11. The wiper blade according to claim 8, wherein the arm accommodation portion is a recess that is recessed in the holder member in the top-to-bottom direction.

12. The wiper blade according to claim 8, wherein the gate trace is a single gate trace, which is formed in a longitudinal center portion of the holder member.

* * * * *